United States Patent
He et al.

(10) Patent No.: US 7,764,322 B2
(45) Date of Patent: Jul. 27, 2010

(54) LIQUID CRYSTAL TESTING APPARATUS AND METHOD FOR IMAGE CAPTURE DEVICES

(75) Inventors: Fan He, Gurnee, IL (US); Michael W. Frenzer, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 951 days.

(21) Appl. No.: 11/427,715

(22) Filed: Jun. 29, 2006

(65) Prior Publication Data

US 2008/0002029 A1    Jan. 3, 2008

(51) Int. Cl.
*H04N 5/238* (2006.01)
(52) U.S. Cl. .................... 348/363; 348/180
(58) Field of Classification Search ............ 348/180, 348/181, 187, 188, 362, 363
See application file for complete search history.

(56) References Cited

U.S. PATENT DOCUMENTS

| | | | | |
|---|---|---|---|---|
| 4,965,670 A | * | 10/1990 | Klinefelter | 348/586 |
| 5,313,280 A | * | 5/1994 | Straus | 348/181 |
| 5,327,782 A | * | 7/1994 | Sato et al. | 73/129 |
| 6,788,335 B2 | * | 9/2004 | Young et al. | 348/96 |
| 2003/0137655 A1 | * | 7/2003 | Wegmann | 356/124 |
| 2005/0162517 A1 | * | 7/2005 | Fujihara et al. | 348/187 |
| 2007/0091201 A1 | * | 4/2007 | Sasaki | 348/362 |

OTHER PUBLICATIONS

Shenyang Imatech, Inc. FRT2005. General specification attached to this IDS.

\* cited by examiner

*Primary Examiner*—Tuan Ho
(74) *Attorney, Agent, or Firm*—Hisashi D. Watanabe; Philip H. Burrus, IV (57) ABSTRACT

A testing apparatus (100) for an image capture device (401) includes a liquid crystal device (101). The liquid crystal device (101) includes an array of pixels (102), which may actively or passively be changed from a transparent state to an opaque or semi-opaque state. The array of pixels are capable of segmentation into a plurality of predefined regions (107), which may be columns (108) or rows (208). A liquid crystal device driver (105) is configured to actuate the predefined regions (107), individually and sequentially, in a sweep pattern across the liquid crystal device. The testing apparatus (100) may be used to measure a variety of parameters associated with image capture devices, including exposure duration, continuous shutter frequency, and flash-shutter lag. The testing apparatus (100) is capable of operation in a variety of ambient lighting conditions.

18 Claims, 7 Drawing Sheets

LIQUID CRYSTAL TESTING APPARATUS AND METHOD FOR IMAGE CAPTURE DEVICES

BACKGROUND

1. Technical Field

This invention relates generally to test equipment for image capture devices, and more specifically to a liquid crystal testing apparatus for image capture devices, where the liquid crystal apparatus is disposed between an image capture device and a subject.

2. Background Art

Photography is experiencing an explosion in popularity due to advances in technology. Digital cameras and digital imaging are fueling a new interest in photography. Not too long ago, the only way to capture an image was to use a film camera. A user adjusted and aimed the camera at a subject, and then took the picture. The user then had no idea what the picture looked like until they removed the film from the camera, took the film to a processing center, and had the film developed.

Digital cameras have revolutionized photographic process. With a digital camera, one points and shoots, seeing the image appear instantly on a display without the need of developing film. What's more, when the picture fails to turn out as planned, the user simply deletes the electronic image from memory and shoots again. The efficiency and low cost associated with digital photography is very appealing to consumers. It is so appealing, in fact, that digital cameras are showing up on all types of electronic devices, including mobile telephones.

With the wide variety of digital camera manufacturers and devices, it is sometimes difficult to compare "apples to apples" when purchasing a digital camera, or an electronic device having an integrated digital camera. Often, the specifications for each digital camera include different measurements or test conditions, making it difficult for a consumer to determine how the digital camera will perform in the real world. One reason for this difficulty is the fact that there is no test equipment available that is capable of measuring digital camera performance data, including exposure duration, frame rate, and flash shutter lag, in a variety of lighting conditions. While some specialized equipment is capable of making these measurements in a low-light laboratory, such measurements are often not indicative of, for example, the digital camera's performance in broad daylight. The discrepancy may be due to a variety of factors, including integrated metering, electronic device characteristics, and so forth.

There is thus a need for a testing apparatus for image capture devices that is capable of operation in bright light, as well as low light, conditions.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to testing image capture devices with a liquid crystal testing apparatus. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of testing image capture devices with a liquid crystal testing apparatus in accordance with embodiments of the invention. The non-processor circuits may include, but are not limited to, software modules, communication circuits, signal drivers, clock circuits, power source circuits, and user input devices. As such, these functions may be interpreted as steps of a method to perform image capture device testing by using a liquid crystal testing apparatus. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 1:
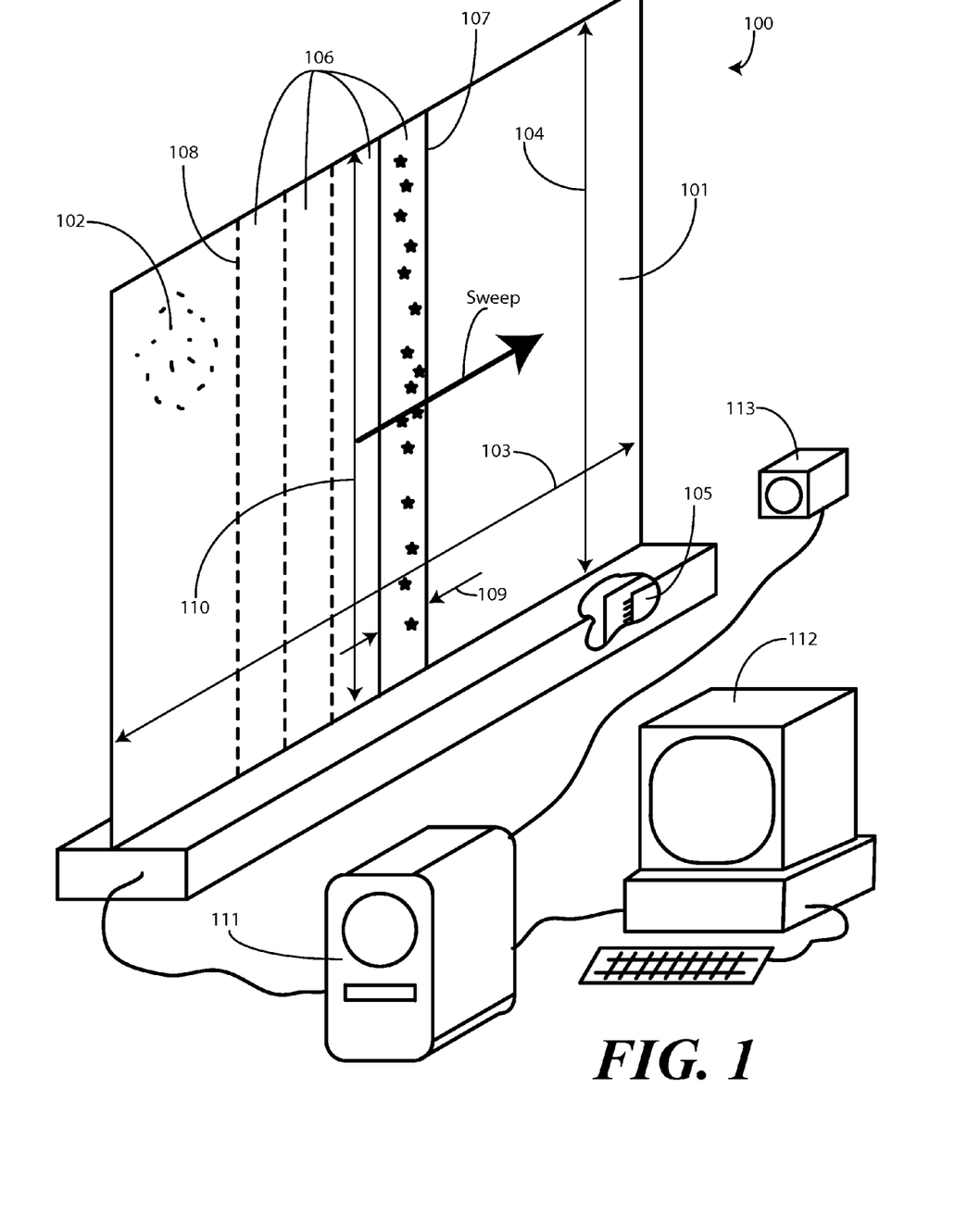
FIG. 1 illustrates one embodiment of a liquid crystal testing apparatus for image capture devices in accordance with the invention.

Turning now to FIG. 1, illustrated therein is one embodiment of a testing apparatus 100 for testing image capture devices in accordance with the invention. The testing apparatus 100 includes a liquid crystal device 101 comprising an array of pixels 102. The liquid crystal device 101 is a panel or display that may be changed from a translucent to an opaque or semi-opaque state. For example, in one embodiment, the liquid crystal device 101 is transparent when the array of pixels 102 is unactuated, and is opaque when the array of pixels is actuated. The liquid crystal device 101 has an associated device width 103 and a device length 104. The liquid crystal device 101 may be one of a variety of types of liquid crystal devices, including STN, TN, cholesteric and polymer dispersed liquid crystal devices. The liquid crystal device 101 may be active or passive.

Figure 2:
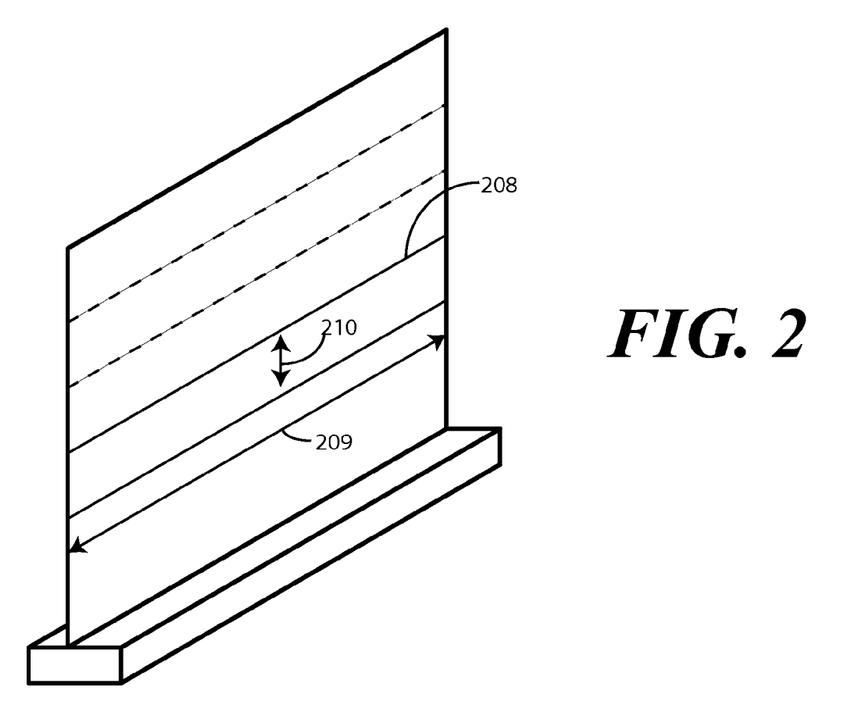
FIG. 2 illustrates an alternate embodiment of a liquid crystal testing apparatus for image capture devices in accordance with the invention.

A liquid crystal device driver 105 is included in the testing apparatus 100 for controlling the liquid crystal device 101. The liquid crystal device driver 105 is configured to actuate a plurality of subsets of pixels in the array of pixels 102, individually, at any given moment in time. In one embodiment, the liquid crystal device driver 105 is configured to actuate a plurality of subsets 106 of the array of pixels 102 as predefined regions, where predefined regions 107 are groups of pixels forming either "bars" or "rows". The bars are columns 108 having a predetermined column width 109 and a predetermined column length 110. Turning briefly to FIG. 2, rows 208 have a predetermined row width 209 and a predetermined row length 210. The columns 108 run the device length 104 of the liquid crystal device 101, while the rows 208 run the device width 103 of the liquid crystal device 101. While bars or rows will be described and illustrated herein, it will be clear to those of ordinary skill in the art having the benefit of this disclosure that the invention is not so limited. Other subsets of pixels, including circles, squares, and non-standard geometric shapes may also be used.

In one embodiment, the liquid crystal device driver 105 actuates the predefined regions 107 individually and sequentially in a sweep pattern. The liquid crystal device driver 105 actuates a first predefined region, then a second predefined region, then a third, and so forth, sequentially, such that the actuated predefined regions pass across the liquid crystal device 101 in a wave-like or sweeping pattern. While the predefined regions 107 are actuated individually, the duration of actuation may be of a length such that multiple predefined regions 107 are actuated simultaneously.

The predefined regions 107 are actuated in accordance with an input frequency received from an adjustable frequency generator 111. The adjustable frequency generator 111 delivers the input frequency to the liquid crystal device driver 105. The input frequency determines how fast the predefined regions 107 sweep across the liquid crystal device 101. The adjustable frequency generator 111 may be a standalone device. It may also be integrated with the liquid crystal device driver 105. It may be controllable by a computer 112, and may also be responsive to a photodetector 113. In one embodiment, where the adjustable frequency generator 111 is responsive to the photodetector 113, a flash operating at a flash frequency, either coupled to an image capture device or independent as a separate strobe, is capable of altering the input frequency such that the input frequency is proportional to the flash frequency received by the photodetector 113. Such an embodiment is useful in synchronizing the testing apparatus 100 and image capture device as will be described below.

The testing apparatus 100 may be used to measure characteristics of image capture devices, including exposure duration, continuous shutter speed, and flash-shutter lag. Many of these measurements, as described below, are made by placing a subject on one side of the liquid crystal device 101, and then placing the image capture device on the other. As the liquid crystal device 101 is translucent in one embodiment, when the array of pixels 102 is not actuated, the testing apparatus 100 is capable of making these measurements in ambient lighting conditions, be it bright or low-level lighting.

Once the subject and image capture device are in position, the image capture device begins taking pictures of the subject. Once the testing apparatus 100 and image capture device are synchronized, measurements may be obtained by counting the predefined regions 107 appearing in images. Thus, in some testing, the dimensions of the predefined regions 107 become important. For example, in measuring exposure duration, where the predefined regions 107 comprise columns 108, column widths less than or equal to the product of the device width 103, input frequency, and exposure time measurement resolution may be used to obtain accurate results in a variety of lighting conditions. Experimental testing has shown that an exposure time measurement resolution of between 1 millisecond and 1 second works well in making this measurement.

Figure 3:
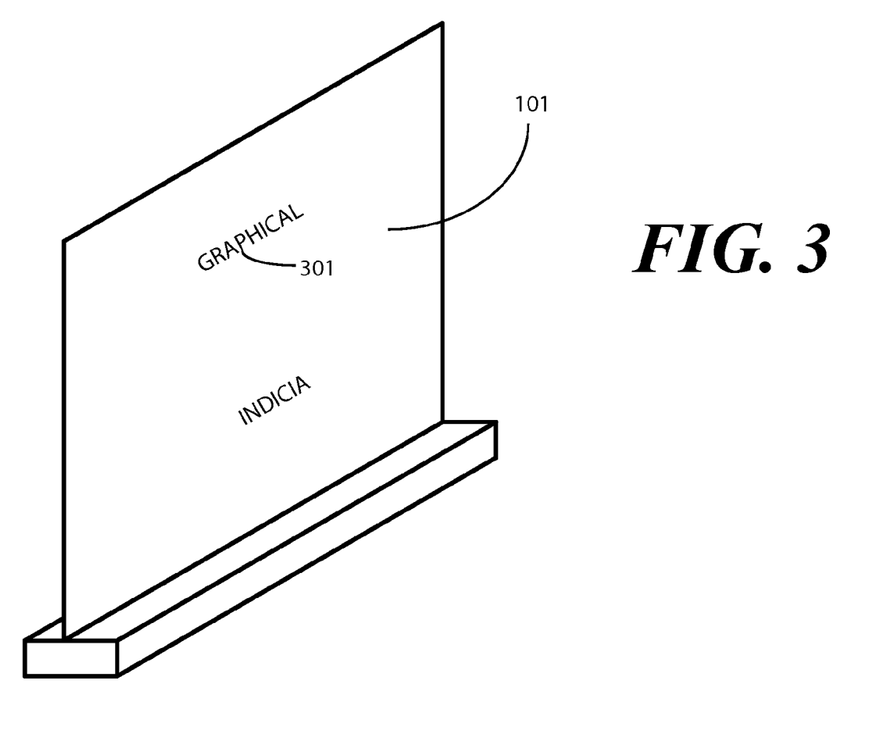
FIG. 3 illustrates another alternate embodiment of a liquid crystal testing apparatus for image capture devices in accordance with the invention.

Turning briefly to FIG. 3, the liquid crystal device 101 may additionally include graphical indicia 301 disposed thereon. The graphical indicia 301 may be printed on the surface of the liquid crystal device 101, or may be generated by the actuation of selected pixels from the array of pixels (102). By way of example, the graphical indicia 301 may include instructions on using the device. The liquid crystal device driver (105) may present a user with instructions prior to using the device. Alternatively, the graphical indicia 301 may comprise a test pattern, such as a Macbeth table, suitable for use in testing image capture devices.

Figure 4:
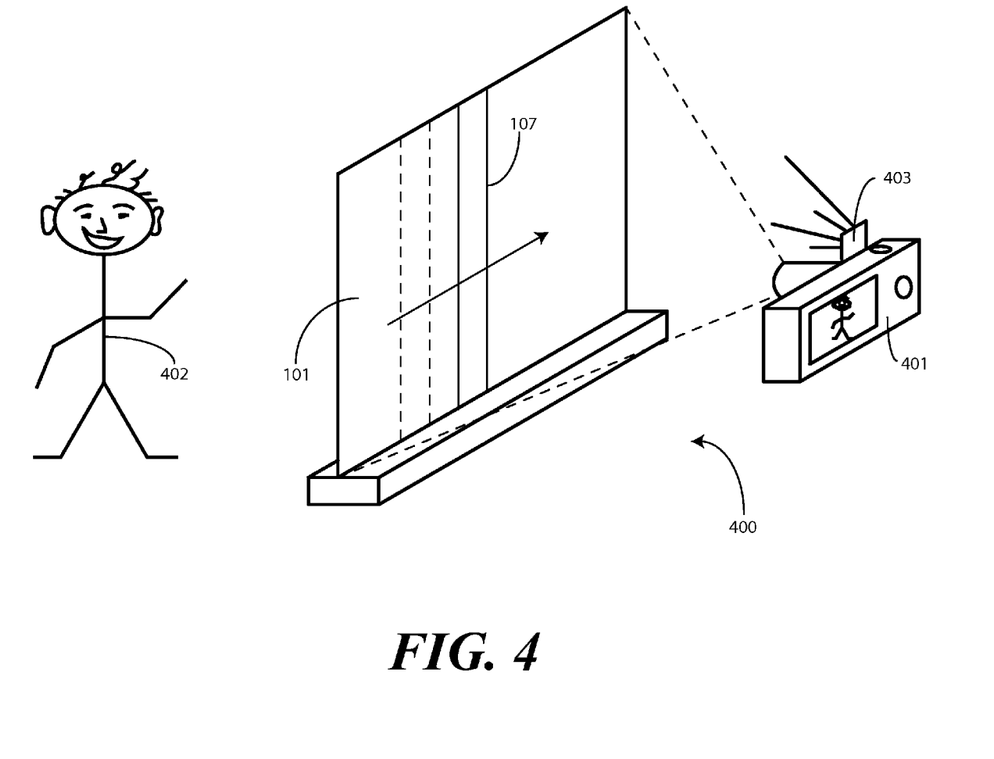
FIG. 4 illustrates one embodiment of an image capture testing apparatus in accordance with the invention.

Turning now to FIG. 4, illustrated therein is a system 400 for measuring a parameter, such as duration of exposure or continuous shutter speed, associated with an image capture device 401 in accordance with one embodiment of the invention. In the system, an image capture device 401 is placed on one side of the liquid crystal device 101, while a subject 402 is placed on the other. The image capture device 401 may include a flash 403.

The liquid crystal device driver (105) begins sweeping the predefined regions 107 across the liquid crystal device 101 at the input frequency. The image capture device 401 begins capturing images of the subject 402 through the liquid crystal device 101. Once the image capture device 401 and the liquid crystal device 101 are synchronized, as will be described below with FIG. 5, a variety of measurements may be made. For example, exposure duration may be measured by counting the number of predefined regions 107 appearing in an image and multiplying the number by a period associated with each predefined region 107. Additionally, shutter frequency may be measured by synchronizing the liquid crystal device 101 with the image capture device 401 and determining the input frequency.

Figure 5:
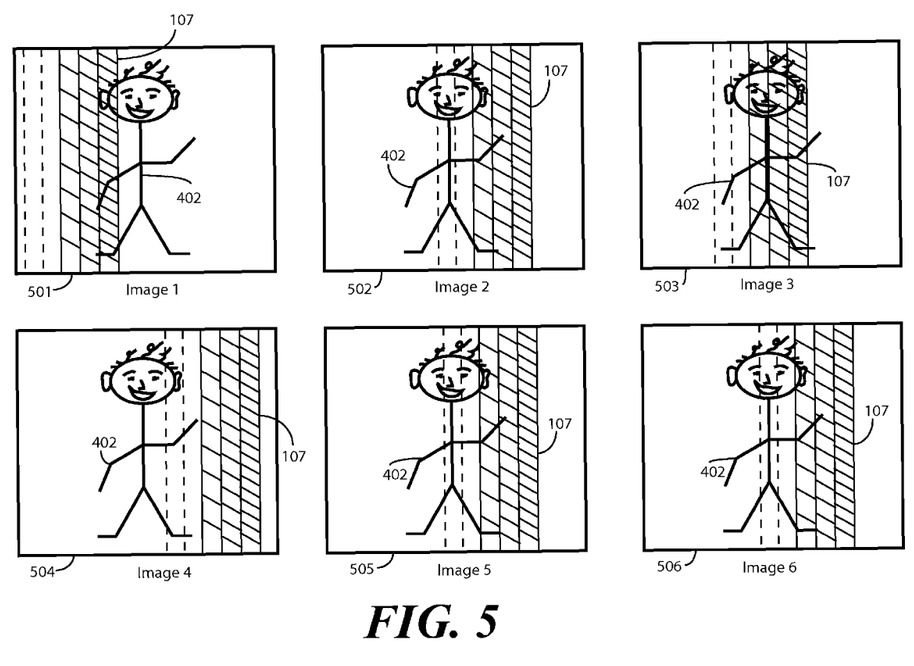
FIG. 5 illustrates a series of exemplary images that may be captured by an image capture device using a liquid crystal testing apparatus in accordance with one embodiment of the invention.

Turning now to FIG. 5, illustrated therein is a series of images captured by the image capture device (401) configured as shown in FIG. 4. The image capture device (401) is capturing images of the subject 402 through the liquid crystal device (101). The liquid crystal device driver (105) is sweeping the predefined regions 107 across the liquid crystal device (101) at the input frequency.

As mentioned above, to make some measurements, the image capture device (401) needs to be synchronized with the liquid crystal device (101). One way to do this is by capturing a series of images 501,502,503,504,505,506 and adjusting the adjustable frequency generator (111) until at least one of the predefined regions 107 is active at substantially the same position in at least two consecutive images 505,506 from the series of images 501,502,503,504,505,506. Then, selecting one image from the two consecutive images 505,506, the measurement may be made.

Image 501 shows the subject with the predefined regions 107 sweeping across the liquid crystal device (101). When compared with image 502, the predefined regions 107 have moved to a different position, farther right in the frame than in image 501. When such images are viewed successively as video, the predefined regions 107 will appear to blink across the screen. This is indicative of the input frequency not being synchronized with the image capture device.

Comparing image 503 with image 504, the same is true—the predefined regions are in different positions. This is also the case when comparing image 505 and image 506. Thus, the input frequency may again be adjusted.

When comparing image 505 to image 506, the predefined regions 107 are active at substantially the same position in each image. When such images are viewed continuously, as video, the predefined regions 107 appear to momentarily stand still, indicating that the input frequency and liquid crystal device (101) are synchronized with the image capture device (401). Where this is the case, measurements such as exposure duration and shutter frequency may be obtained.

Figure 6:
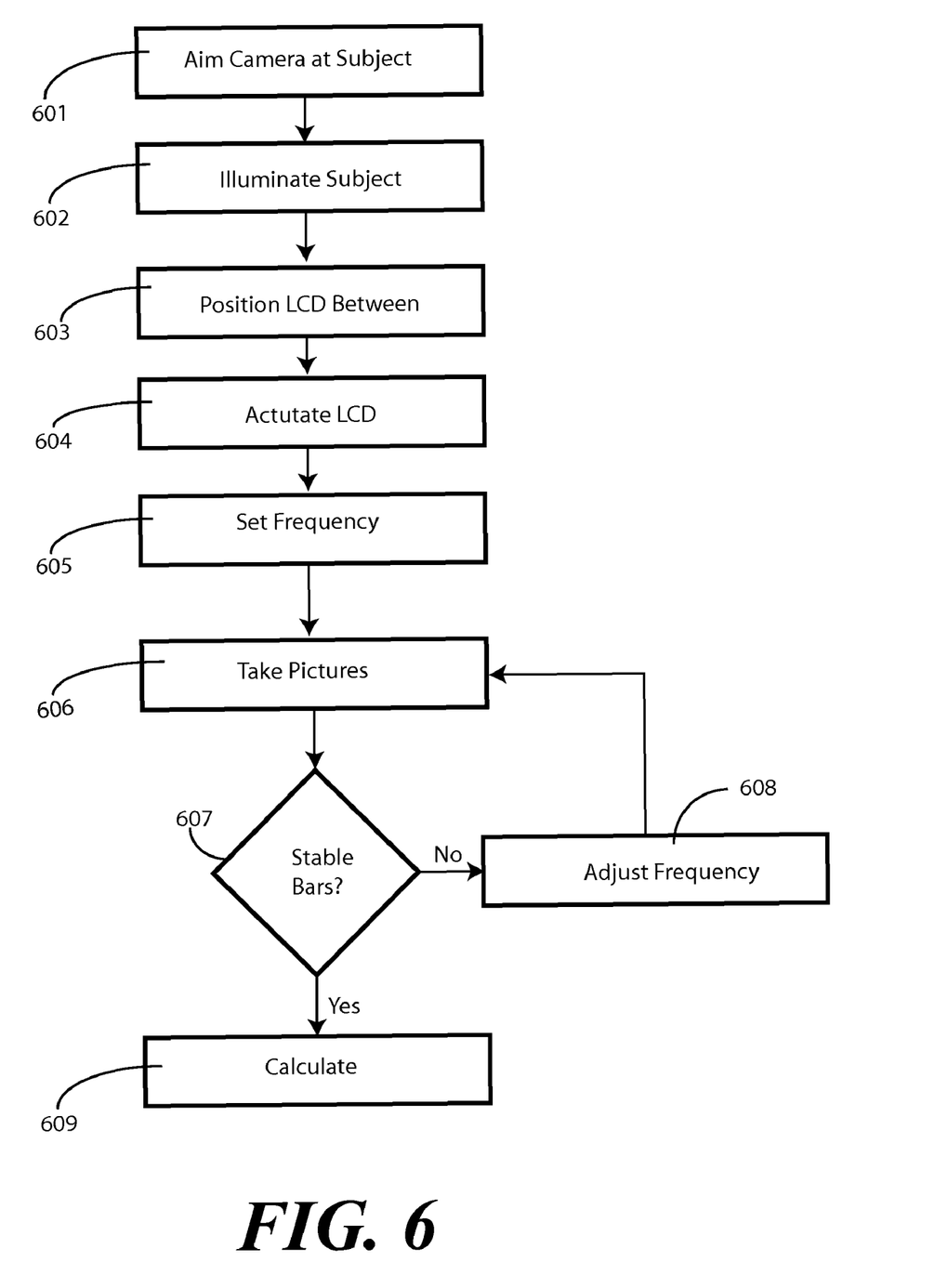
FIG. 6 illustrates one embodiment of a method for determining a continuous shutter rate associated with an image capture device by using a liquid crystal testing apparatus in accordance with the invention.

Turning now to FIG. 6, illustrated therein is one embodiment of a method for determining a continuous shutter rate using the testing apparatus (100) in accordance with the invention. Continuous shutter rate is the rate at which multiple images may be obtained from the image capture device (401). For example, when a digital camera is placed in burst mode, the camera may take between two and ten images continuously. The rate at which this may occur is dependent upon several factors. One significant factor is the metering that must occur when the image capture device (401) sets aperture and exposure. Metering is dependent upon the ambient light, which is why the testing apparatus (100) in accordance with the invention is useful for making such measurements.

At step 601, the image capture device (401) is aimed at the subject (402). Where required, the subject (402) may be illuminated such that a level of subject illuminance is above or below a predetermined number of footcandles as required by a particular test at step 602. The liquid crystal device (101) is placed between the subject (402) and the image capture device (401) at step 603. As with FIG. 1 above, in one embodiment, the liquid crystal device (101) includes the array of pixels (102) that are capable of segmentation into a plurality of the predefined regions (107), individually and sequentially, in a sweep pattern in accordance with an input frequency.

At step 604, the liquid crystal device (101) is actuated, thereby causing the predefined regions (107) to begin sweeping across the device. At step 605, the input frequency is set. At step 606, the image capture device (401) begins capturing at least one image. Where synchronization is required, the image capture device (401) may capture a plurality of images.

Where synchronization is required, decision 607 determines whether the predefined regions (107) are at substantially the same position from frame to frame. Where they are not, the input frequency is adjusted at step 608 until one of the plurality of the predefined regions (107) is active at substantially the same position in at least two images selected from the plurality of images. Where the predefined regions (107) are stable, the continuous shutter rate may be determined simply by determining the input frequency from the adjustable frequency generator (111).

In one embodiment, where the liquid crystal device (101) is coupled to a photodetector (113), the step of adjusting the frequency generator, i.e. step 608, may be performed by providing a strobe flash having a selected frequency. By adjusting the frequency of the strobe flash, the input frequency is adjusted, as the input frequency is proportional to the strobe flash frequency in one embodiment. Adjustment of the strobe flash frequency provides an alternate means of synchronizing the predefined regions (107) with the image capture device (401).

Figure 7:
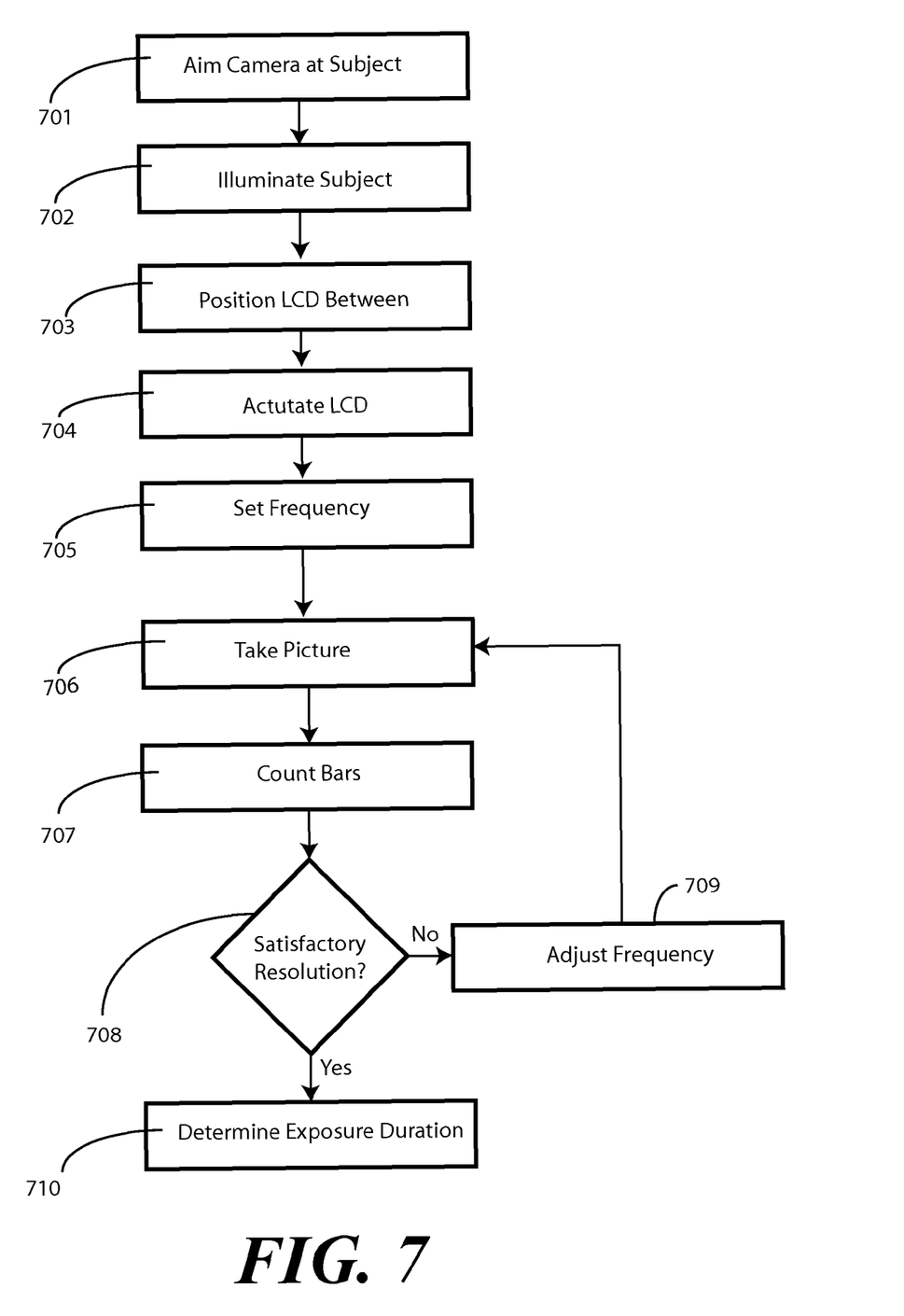
FIG. 7 illustrates one embodiment for determining duration of exposure in an image capture device by using a liquid crystal testing apparatus in accordance with the invention.

Turning now to FIG. 7, illustrated therein is one embodiment of a method for determining a duration of exposure associated with the image capture device (401) by using the testing apparatus (100) in accordance with the invention. At step 701, the image capture device (401) is aimed at the subject (402). At step 702, where required, the subject is illuminated such that the subject illuminance is at the required footcandle level. At step 703, the liquid crystal device (101) having an array of pixels capable of segmentation by the liquid crystal device driver (105) into a plurality of predefined regions, individually and sequentially, in a sweep pattern, is placed between the subject (402) and the image capture device (401). At step 704, the liquid crystal device (101) is actuated.

At step 705, the adjustable frequency generator (111) is set to provide an input frequency to the liquid crystal display driver (105). At step 706, the image capture device (401) begins taking at least one image. At step 707, the number of active predefined regions (107) appearing in one of the images selected during synchronization is determined.

At decision 708, one may determine whether a satisfactory resolution has been achieved. Where it has not, at step 709, the adjustable frequency generator (111) may be adjusted until satisfactory exposure resolution is achieved. At step 710, exposure is determined by multiplying the number of predefined regions (107) appearing in the image by an active period associated with the predefined regions (107).

Figure 8:
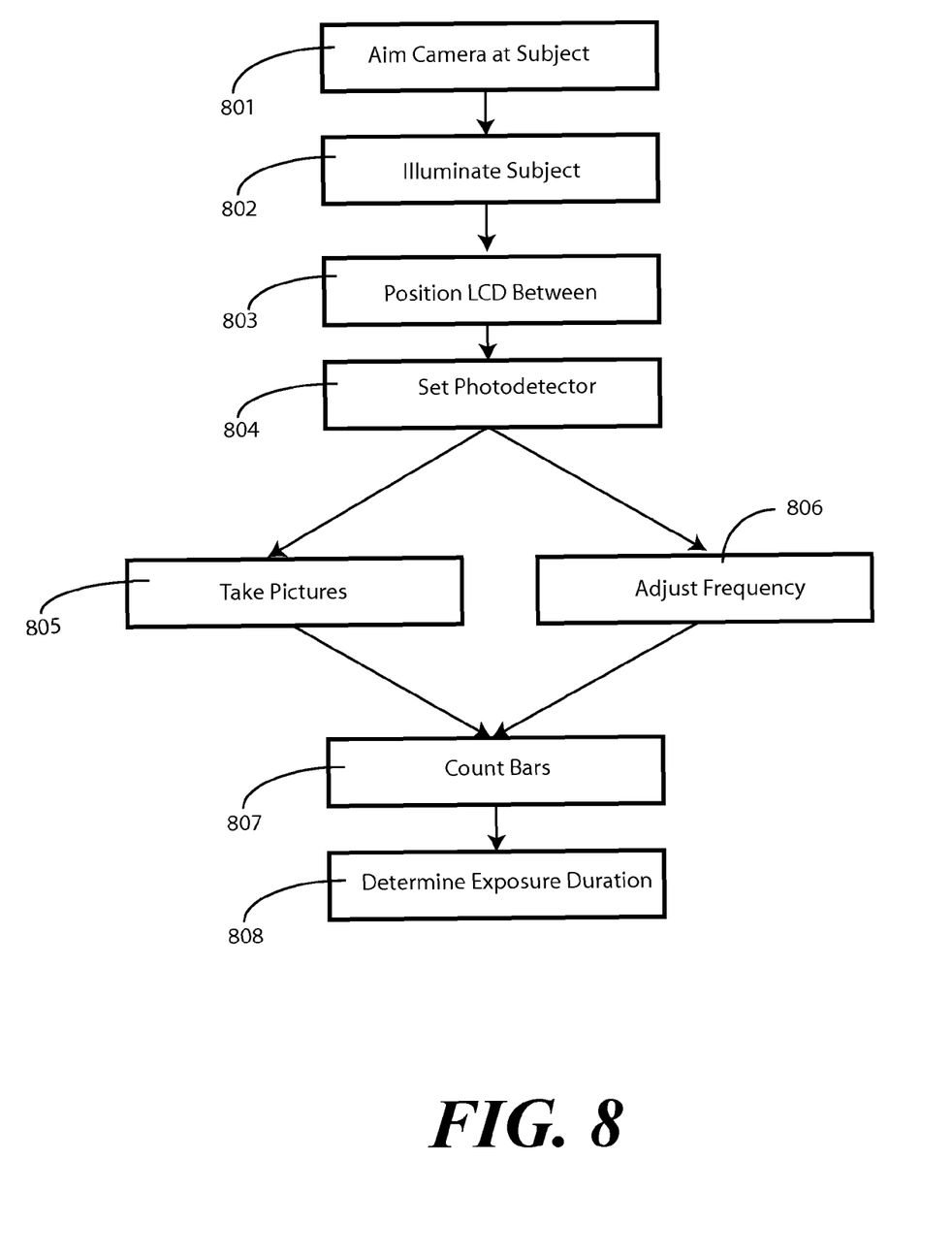
FIG. 8 illustrates one embodiment of a method for determining flash shutter lag in an image capture device by using a liquid crystal testing apparatus in accordance with the invention.

Turning now to FIG. 8, illustrated therein is one embodiment of a method for determining a lag time between a flash exposure and a corresponding image capture in the image capture device (401), the method employing the testing apparatus (100) in accordance with the invention. In this method, the liquid crystal device driver (105) is configured to begin sweeping predefined regions (107) across the liquid crystal device (101) upon receipt of light by the photodetector (113) from the flash (403).

At step 801, the image capture device (401) is aimed at the subject (402). At step 802, where required, the subject (402) may be illuminated. At step 803, the liquid crystal device (101) is positioned between the subject (402) and the image capture device (401). At step 804, the photodetector (113) is armed so as to begin sweeping the predefined regions (107) across the liquid crystal device (101) upon receipt of light from the flash (403).

At steps 805 and 806, the flash and image capture are initiated. On conventional digital cameras, this may be accomplished simply by pressing the shutter release button. As there is a finite lag between flash and image capture, some of the predefined regions (107) will sweep across the liquid crystal device (101) between the time the flash (403) pops and the time the image is captured. To determine this time, at step 807, the number of predefined regions (107) appearing in an image is determined. To calculate time, the number of predefined regions (107) appearing in the image is multiplied by a predefined region active period at step 808.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. An apparatus for measuring one of a duration of exposure and a continuous shutter speed of an image capture device, the apparatus comprising:
   a. a transparent liquid crystal device comprising an array of pixels, the transparent liquid crystal device having a device width;
   b. a liquid crystal device driver configured to actuate any of a plurality of subsets of the array of pixels individually, wherein the liquid crystal device driver actuates the plurality of subsets individually and sequentially in a sweep pattern in accordance with an input frequency; and
   c. an adjustable frequency generator configured to deliver the input frequency to the liquid crystal device driver;
   wherein the plurality of subsets define a plurality of predefined regions, wherein each of the plurality of predefined regions comprises one of columns having a predetermined column length and a predetermined column width and rows having a predetermined row length and a predetermined row width.

2. The apparatus of claim 1, wherein the plurality of predefined regions comprise columns, wherein the predetermined column width is less than or equal to a product of the device width, the input frequency and an exposure time measurement resolution.

3. The apparatus of claim 2, wherein the exposure time measurement resolution is between 1 millisecond and 1 second.

4. The apparatus of claim 1, wherein when any of the plurality of subsets is active, the any of the plurality of predefined regions is opaque.

5. The apparatus of claim 1, further comprising graphical indicia disposed on the transparent liquid crystal device.

6. The apparatus of claim 1, wherein the liquid crystal device driver is further configured to present graphical indicia by actuating selected pixels of the transparent liquid crystal device.

7. The apparatus of claim 1, further comprising a photodetector, wherein the liquid crystal device driver is responsive to the photodetector.

8. The apparatus of claim 7, wherein the adjustable frequency generator is responsive to the photodetector, such that the input frequency is proportional to a flash frequency received by the photodetector.

9. A system for measuring one of a duration of exposure and a continuous shutter speed of an image capture device, the system comprising:
   a. a transparent liquid crystal device comprising an array of pixels disposed between the image capture device and a subject;
   b. a liquid crystal device driver configured to selectively actuate the array of pixels in a plurality of predefined regions, individually and sequentially, in a sweep pattern in accordance with an input frequency, wherein the plurality of predefined regions comprise one of columns or rows; and
   c. an adjustable frequency generator configured to deliver the input frequency to the liquid crystal device driver.

10. The system of claim 9, wherein when any of the plurality predefined regions is active, the any of the plurality of predefined regions is opaque.

11. A method for determining a continuous shutter rate associated with an image capture device, the method comprising the steps of:
   a. aiming the image capture device at a subject;
   b. placing a transparent liquid crystal device between the image capture device and the subject, the transparent liquid crystal device comprising an array of pixels, the transparent liquid crystal device having a liquid crystal device driver configured to actuate the array of pixels in a plurality of predefined regions, individually and sequentially in a sweep pattern, in accordance with an input frequency received from an adjustable frequency generator;
   c. causing the image capture device to capture a plurality of images; and
   d. adjusting the adjustable frequency generator until one of the plurality of predefined regions is active at substantially a same position in at least two consecutive images selected from the plurality of images.

12. The method of claim 11, further comprising the step of determining from the adjustable frequency generator the continuous shutter rate.

13. The method of claim 11, wherein the adjustable frequency generator comprises a photodetector, further wherein the step of adjusting the adjustable frequency generator comprises the step of providing a strobe flash having a selected frequency to the photodetector.

14. The method of claim 11, further comprising the step of illuminating the subject such that a level of subject illuminance is less than a predetermined number of footcandles.

15. A method for determining a duration of exposure associated with an image capture device, the method comprising the steps of:
   a. aiming the image capture device at a subject;
   b. placing a transparent liquid crystal device between the image capture device and the subject, the transparent liquid crystal device comprising an array of pixels, the array of pixels being capable of segmentation into a plurality of predefined regions, individually and sequentially, in a sweep pattern in accordance with an input frequency received from an adjustable frequency generator;
   c. causing the image capture device to capture at least one image; and
   d. determining a number of active predefined regions appearing in the at least one image; and e. multiplying the number of active predefined regions by an active period for each of the plurality of predefined regions.

16. The method of claim 15, wherein the step of causing the image capture device to capture the at least one image comprises causing the image capture device to capture a series of images, further comprising the step of adjusting the adjustable frequency generator until at least one of the plurality of predefined regions is active at substantially a same position in at least two consecutive images selected from the series of images.

17. The method of claim 16, wherein the at least one image is selected from the at least two consecutive images.

18. A method of determining a lag time between a flash exposure and an image capture in an image capture device, the method comprising the steps of:

a. placing a transparent liquid crystal device before the image capture device, the transparent liquid crystal device comprising a photodetector and an array of pixels, the array of pixels being capable of segmentation into a plurality of predefined regions, individually and sequentially, in a sweep pattern in response to the photodetector;

b. causing the image capture device to actuate a flash and capture at least one image;

c. determining a number of active predefined regions appearing in the at least one image; and d. multiplying the number of active predefined regions by an active period to determine the lag time.

* * * * *